May 28, 1963 C. R. MAXWELL 3,091,228
ENGINE WITH TURBOCHARGER AND AFTERCOOLER
Filed April 17, 1961
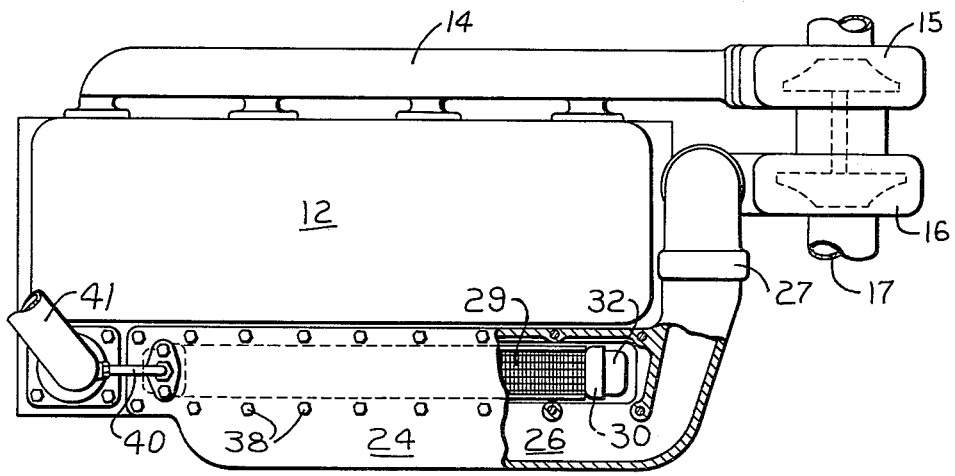
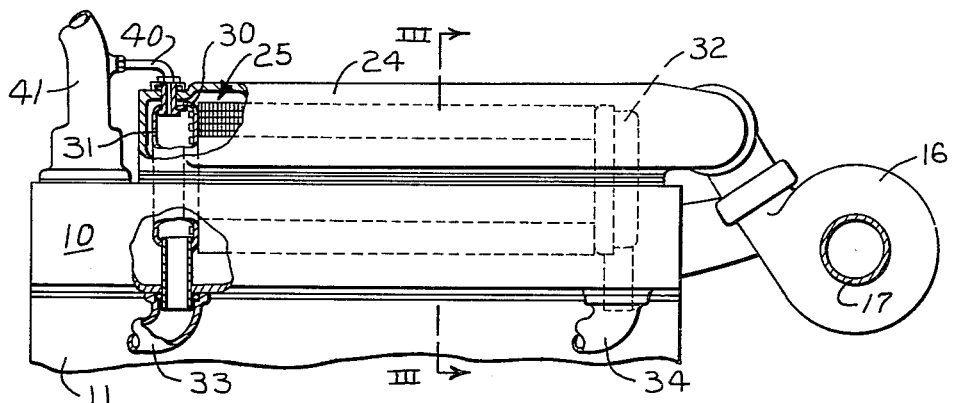
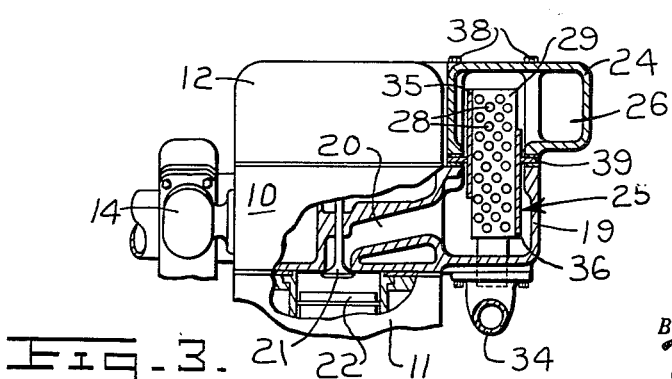
INVENTOR.
CARL R. MAXWELL
BY
Fryer and Zimwald
ATTORNEYS 3,091,228
ENGINE WITH TURBOCHARGER AND
AFTERCOOLING
Carl R. Maxwell, Washington, Ill., assignor to Caterpillar
Tractor Co., Peoria, Ill., a corporation of California
Filed Apr. 17, 1961, Ser. No. 103,376
1 Claim. (Cl. 123—119)

This invention relates to engine design and particularly to engines which employ turbochargers and aftercoolers.

An important consideration in present day engine design is the space occupied by the engine and its associated elements. Present demands for increased power are not accompanied by acceptance of larger engine compartments and the addition of turbochargers and aftercoolers to engines of more or less standard design is greatly complicated by the necessity of installing the engine in the limited space available for example in boats, trucks and other vehicles.

Aftercoolers are used with superchargers to reduce the heat acquired by air during its compression and thus increase the quantity of useful oxygen in a given volume of air. Since aftercoolers are in fact heat exchangers requiring large surface areas for the transmission of heat from one fluid medium to another their use with engines has heretofore greatly increased the overall space requirement for the engine assembly.

It is the object of the present invention therefore to provide an engine with an aftercooler disposed as efficiently and compactly as possible.

A further object is to provide an aftercooler which is a part of the basic engine as distinguished from the usual separately enclosed device connected with the engine through externally arranged conduits.

Another object of the invention is the provision of an engine having an aftercooler designed and arranged to discharge in close proximity to the engine cylinders to obtain the fullest benefit of cooling.

Still further and more specific objects and advantages of the invention are made apparent in the following specification wherein reference is made to the accompanying drawing.

In the drawing:

FIG. 1 is a schematic plan view of an engine with a turbocharger and having an after cooler for the turbocharger constructed and arranged in accordance with the present invention;

FIG. 2 is a fragmentary view in side elevation of the same engine with parts shown in section; and FIG. 3 is a fragmentary end elevation of the same engine partially in section on the line III—III of FIG. 2.

Referring to the drawings in detail, the engine embodying the present invention is shown as having a head block 10 disposed on top of a conventional cylinder block, a portion of which is shown at 11 in FIGS. 2 and 3 and containing a plurality of cylinders arranged in line. A cover 12 is disposed on top of the head block for closing valve actuating cam shafts (not shown) in the usual manner. The exhaust manifold which is shown at 14 in FIG. 1 discharges the exhaust of the engine to the turbine 15 of a conventional turbocharger which drives the compressor 16 thereof. Atmospheric air entering the compressor through an inlet 17 is compressed and delivered to the engine usually first through a heat exchanger or aftercooler disposed beside the engine and then through the intake manifold thereof. In some engines, the intake manifold is cast integrally as in the present instance where in FIG. 3 the intake manifold is shown at 19 as formed integrally with the head block 10 and with passages 20 communicating one with each of the intake valves, one such valve being shown at 21 in FIG. 3 as serving one of the engine cylinders having the usual piston 22 therein.

The present invention provides a cover 24 for the intake manifold 19 which in effect enlarges it and provides space for an aftercooler generally indicated at 25 which extends throughout substantially the entire length of the intake manifold. The cover 24 is of substantially the same height in assembly as the cover 12. It extends a slight distance outwardly beyond the manifold 19 to provide an intake or entry passage 26 for compressed air which as best shown in FIG. 1 is delivered thereto from the compressor 16 through a fitting 27.

The aftercooler 25 is made up of a plurality of horizontally disposed tubes 28 extending through a plurality of heat transfer fins 29 and end plates shown at 30. Housings 31 and 32 cover the end plates and a coolant is circulated through these housings and the tubes 28 by means of fittings 33 and 34 which are in communication with a suitable source of coolant, not shown. The source may be the radiator of a motor vehicle or a raw water pump in the case of marine installations.

On opposite sides of the tube bundle of the aftercooler are plates or baffles best shown at 35 and 36 in FIG. 3. The baffle 36 is disposed toward the lower portion of the tube bundle leaving an opening opposite the air intake 26 and the baffle 35 is disposed toward the upper portion of the tube bundle leaving an opening directly opposite the passages 20 which communicate with the intake valves and cylinders. Flanges 39 with suitable gaskets are secured to the baffles and support the entire tube bundle by being clamped between the cover 24 and the intake manifold 19 as by cap screws shown at 38. These flanges prevent air from passing around the after cooler so that all air entering through the passage 26 must pass downwardly over the cooling tubes and fins and it is then immediately directed through the passages 20 and the intake valve 21 with a minimum of opportunity to absorb heat from contact with the engine after it has been cooled. A bleed passage or vent line 40 connects the upper portion of the aftercooler with a fitting 41 which may lead, for example, to a radiator top tank to prevent air or vapor from becoming entrapped with the liquid coolant.

The arrangement of the after cooler of the present invention serves not only to save space and maintain a compact engine design but also to improve the efficiency of the cooling function.

Since the elongate intake manifold has short passages communicating with an in line bank of cylinders through their intake valves, the positioning of the tube bundle of the aftercooler lengthwise in the manifold and passing air to be cooled from the long passage 26 over the tubes provides a very short path for the cooled air to the cylinders of the engine.

The invention herein disclosed is readily adaptable to V-type engines by disposing an aftercooler in each of the two intake manifolds thereof.

I claim:

In an internal combustion engine having an in line bank of cylinders, an elongate intake manifold with passages communicating with said cylinders, a supercharger for compressing and directing air to the manifold, and an aftercooler comprising an elongate tube bundle in said manifold, the improvement which comprises said manifold having an upper and lower portion communicating only through said tube bundle, said upper portion receiving air from the supercharger, and said lower portion communicating with said passages, and baffle means on opposite sides of the tube bundle to confine the air to a generally downward path therethrough.

References Cited in the file of this patent

UNITED STATES PATENTS

| | | |
|---|---|---|
| 2,346,463 | Szekely | Apr. 11, 1944 |
| 2,646,027 | Ackerman et al. | July 21, 1953 |
| 2,858,666 | Fullemann | Nov. 4, 1958 |
| 2,889,682 | Steven et al. | June 9, 1959 |